Oct. 21, 1924.                                            1,512,615
                       T. J. McBRIDE
                       SEEDING MACHINE
               Filed Sept. 30, 1922        2 Sheets-Sheet 1

INVENTOR.
T. J. McBride
BY J. Edward Maybee.
ATTY.

Oct. 21, 1924.
T. J. McBRIDE
SEEDING MACHINE
Filed Sept. 30, 1922

1,512,615

2 Sheets-Sheet 2

INVENTOR.
T. J. McBride.
BY J. Edward Mayber.
ATTY.

Patented Oct. 21, 1924.

1,512,615

UNITED STATES PATENT OFFICE.

THOMAS J. McBRIDE, OF CHRISTCHURCH, NEW ZEALAND.

SEEDING MACHINE.

Application filed September 30, 1922. Serial No. 591,640.

*To all whom it may concern:*

Be it known that I, THOMAS J. MCBRIDE, of the city of Christchurch, New Zealand, a subject of the King of Great Britain, have invented certain new and useful Improvements in Seeding Machines, of which the following is a specification.

This invention relates to apparatus for sowing grain or fertilizer in which a plurality of seed runs are employed fed from a common hopper, and more particularly to apparatus in which the feed is effected by a reciprocating feeder common to all the runs and moving beneath a series of shields located above the feed outlets, and my object is to devise a simple and convenient construction of the shields to provide simple means for simultaneously adjusting the feed to all the outlets, and to devise a hopper construction particularly adapted for use with my feeding means either for the seeder alone or when combined with a fertilizer distributor.

I attain my object by means of the construction hereinafter described and illustrated in the accompanying drawings in which—

Figure 1:
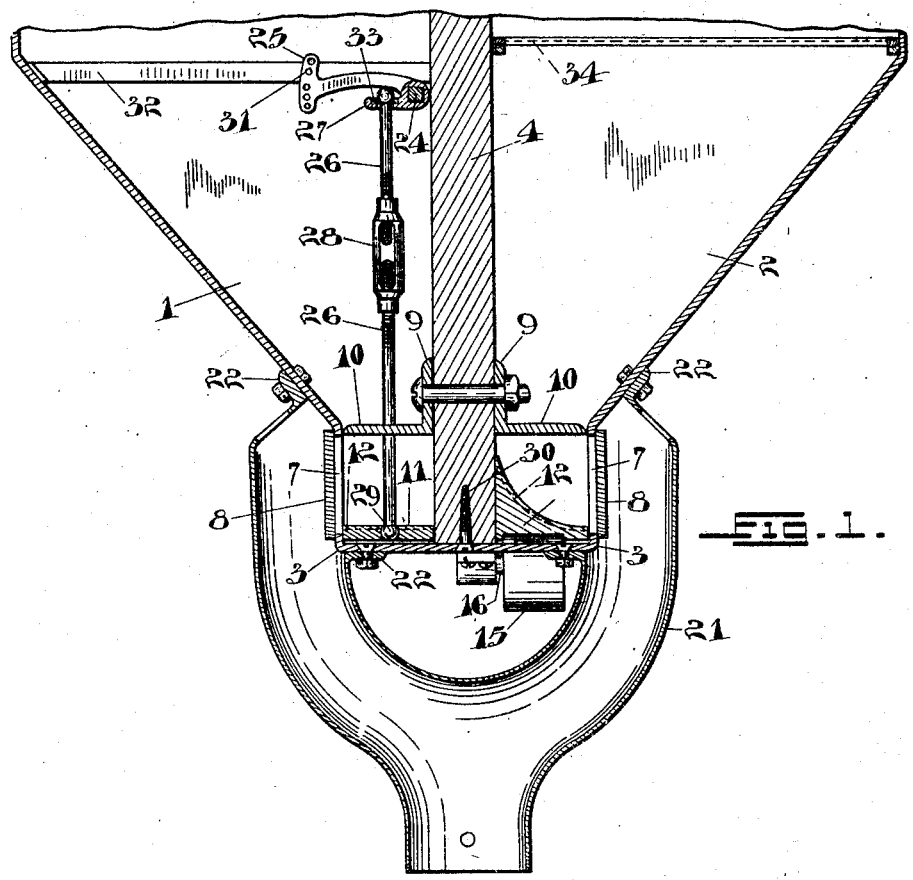
Figure 2:
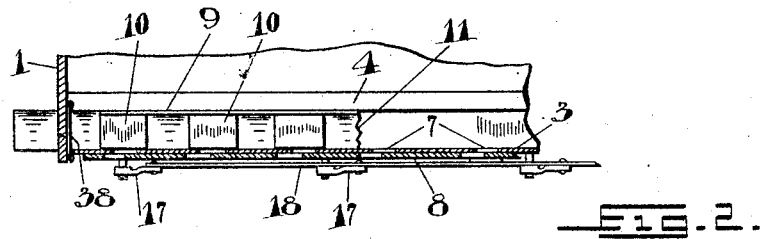
Figure 3:
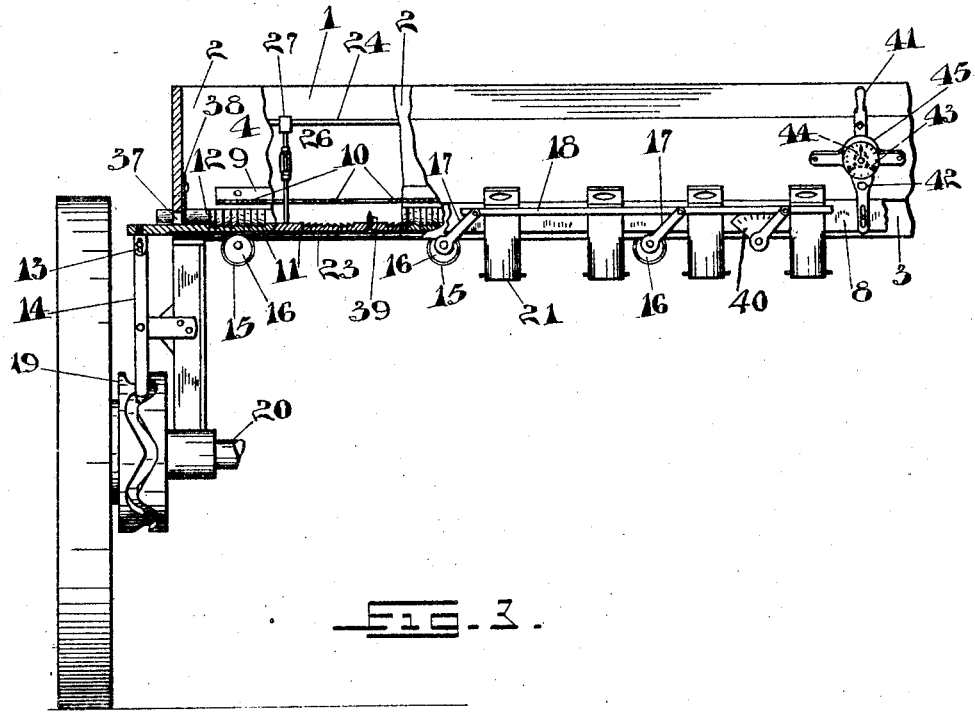

Fig. 1 is a cross section through the seed and fertilizer hopper of a seeding machine;

Fig. 2 a plan view of part of one of the hoppers;

Fig. 3 a rear elevation of part of one of the hoppers, partly in section; and

Figure 4:
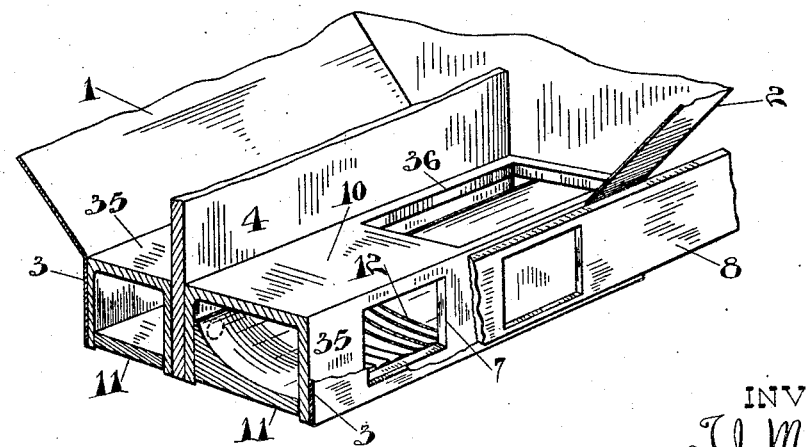

Fig. 4 a perspective detail of a preferred construction of the shields, seed trough and outlets.

In the drawings like numerals of reference indicate corresponding parts in the different figures.

1 is a seed hopper, to which is connected a fertilizer hopper 2. These hoppers, save for the ends, may be formed from a single sheet of metal, which is bent to form the outer sides of the hoppers and a trough 3 at the bottom of each hopper having preferably substantially vertical walls. A partition 4 forms the inner side of each hopper and also of each trough, and is secured in place by screws 30. This construction forms strong, light and simple hoppers with a very small amount of waste space, while the trough at the bottom of each hopper is particularly adapted for the application of my special feeding means.

In one wall of each trough 3 is formed a series of outlets 7. These outlets are adapted to be controlled by a slide 8 provided with suitable openings so that each outlet 7 is simultaneously controlled.

Adjacent the top of the trough 3 and extending substantially from back to front of the same is supported a bar 9, preferably by being secured to the partition 4 and which is cut out to form a series of integrally connected shields 10, separated by intervening openings, through which grain in the hopper passes to the feed bar 11. This bar is adapted to be reciprocated, and, by its reciprocation, to feed the grain which passes down to it, through the openings referred to, to the outlets 7.

To facilitate the feeding right and left hand ratchet shaped serrations 12 are formed on the upper surface of the bar, at least adjacent to the shields. These serrations will carry material towards the outlets but tend to slip under the material on the backward stroke.

While any suitable means may be provided to reciprocate the bar I prefer to secure to the bar the lug 13 pivotally connected by a pin and slot connection to the upper end of a lever 14 fulcrumed on the frame of the machine, and having its lower end provided with a roller adapted to engage a groove in a cam 19 secured to one of the driving wheels on the axle 20 of the seeder. This cam also by means of a similar medium may be used to simultaneously actuate the feed bar of the other hopper, which may be used for fertilizer. The feed bar 11, for the purpose of adjusting the apparatus to sow various sizes of seed, is made adjustable to and from the shields. At the right hand side of Fig. 1 I show the preferred method of effecting this adjustment. The feed bar rests on a series of rollers 15, and each roller is journalled on an eccentric 16 suitably journalled in the bottom of the trough 3. To the end of the journal of each eccentric is connected a rock arm 17, and all the rock arms are pivotally connected with a common connecting rod 18. This rod is connected with a lever, which is movable over a graduated dial 40 of ordinary type, which serves to indicate the position of the lever, and therefore the adjustment of the feed bar to suit the size of seed to be sown. The feed bar passes through an opening 37 in each end of the hopper, and this opening is closed by a slide 38 vertically guided on the end, and through which the bar slides. The loss of seed or fertilizer through the opening is thus prevented without interference with the free movements of the feed bar.

Over each outlet 7 is secured a down pipe 21, preferably by means of lugs 22 suitably bolted, or otherwise secured to the wall of the trough 3. These down pipes are united and each is preferably provided with an opening, through which the flow of seed through the outlet may be observed and the operation of the machine thus checked.

In the bottom of each trough suitable openings 23 are provided for the escape of dust, dirt or any foreign matter which may get underneath the bar.

At the left hand side of Fig. 1 I show a modification of the means for suspending the feed bar. Journalled in the hopper is a rock shaft 24, to which is secured an adjusting lever 25, which is preferably located inside the hopper, and is provided with an arc-shaped end having a series of holes therein with any one of which a pin 31, slidable in the cross brace 32, may be engaged.

A plurality of connecting rods 26 are connected with rock arms 27 secured to the shaft 24, which rods 26 extend down through the spaces between the shields 10 and are connected with the feed bar 11. Preferably ball and socket joints are employed for the connections of these connecting rods. In the preferred construction, each connecting rod is formed of two parts connected by a right and left hand threaded coupling 28 by means of which its length may be adjusted. The lower part of the connecting rod is passed up through a suitable opening in the feed bar, which is formed as a socket to receive the ball head 29 of the connecting rod. The upper part of the connecting rod is passed down through an opening in the corresponding rock arm 27, and its ball head is engaged with a washer 33 fitting a suitable socket formed therein. The parts of the connecting rod may then be secured together by the coupling 28.

It will be seen that the feeding bar swings from the ball joints formed at the upper ends of the connecting rods 26, and that vertical adjustment is effected by rocking the lever 25. Any other method of adjustably supporting the feed bar will, however, fall within the scope of my invention.

At the left hand side of Fig. 1, I show the top of the feed bar 11 as flat transversely, this form being best adapted for sowing seed. At the right hand side, I show the feed bar as concavely curving upwardly from the side adjacent the outlets 7 towards the side adjacent the partition 4. This prevents the sticking of the pulverulent fertilizer for which this feeder is particularly adapted. A screen 34 is preferably fitted in the fertilizer hopper to hold back caked lumps of fertilizer or other matter which might clog the feed. In Fig. 4 I show a preferred construction for the shields, seed trough and outlets. A channel bar 35, placed web up, has openings 36 punched therein to form passages for the grain separated by the shields 10, which form the tops of intervening open ended chambers. The lateral outlet openings 7 leading from these chambers are punched in one of the flanges of the bar. This channel bar is set in the bottom of the hopper and between its flanges the feed bar 11 operates. By this arrangement accuracy of fit and ease of manufacture is attained.

It is obvious that the rods 26 will be oscillated when the bar 11 is reciprocated, thus agitating the seed to cause greater amount of seed to fall through the spaces between the shields 10, in which these rods oscillate then through the other spaces. To ensure an equal amount of seed dropping through the spaces between the shields 10, I provide the bar 11 with upwardly extending projections 39 for causing the seed, falling through the other openings between the shields, a substantially equal amount of agitation as the rods 26.

It will be noted that the serrations 12 follow the contour of the curved bar 11 as shown at the right hand side of Fig. 1, which further facilitates the feeding of the fertilizer to the outlets.

The slide 8 is actuated to open and close the outlets 7 and is adjusted as follows. A lever 41 journalled at 42 on the hopper is connected by means of a pin and slot connection with the slide 8. The lever is provided with a segmental gear 43 meshing with a pinion 44 journalled in a housing 45 secured to the hopper. This housing is provided with a graduated dial concentric with the journal of the pinion, and the latter is provided with an index finger. The lever may be locked, when adjusted, in any suitable manner.

What I claim as my invention is:—

1. In a seeding machine, the combination of a hopper having a rectangular trough at its bottom; a plurality of lateral seed outlets from said trough; shields over said outlets; a bar adapted for reciprocating motion in said trough for the purpose of carrying seed or material to each of said outlets, the edge of the upper surface of said bar adjacent the seed outlets lying normally approximately at the level of the lower edges of said outlets; and means for adjusting the position of said bar relative to the shields.

2. In a seeding machine, the combination of a hopper having a rectangular trough at its bottom; a plurality of lateral seed outlets from said trough; shields over said outlets; a bar adapted for reciprocating motion in said trough for the purpose of carrying seed or material to each of said outlets, the edge of the upper surface of said bar adjacent the seed outlets lying normally approximately at the level of the lower edges of said outlets; and means for supporting said bar at varying distances from the shields.

3. In a seeding machine, the combination of a hopper having a rectangular trough at its bottom; a plurality of lateral seed outlets from said trough; shields over said outlets; a bar adapted for reciprocating motion in said trough for the purpose of carrying seed or material to each of said outlets, the edge of the upper surface of said bar adjacent the seed outlets lying normally approximately at the level of the lower edges of said outlets; rollers on which said bar is supported; and means for adjusting said rollers to vary the distance of the bar from the shields.

4. In a seeding machine, the combination of a hopper having a rectangular trough at its bottom; a plurality of lateral seed outlets therefrom; a bar secured to the hopper at the top of the trough and cut out to form a series of connected shields over said outlets with intervening openings; a bar adapted for reciprocating motion beneath the shields for the purpose of carrying seed and material to each of said outlets.

5. In a seeding machine adjacent seed and fertilizer hoppers formed of sheet metal bent to form an outer sloping side for each hopper and a substantially rectangular trough; and a central partition forming the inside wall of each hopper and secured to the bottom of the trough and dividing it in two.

6. In a seeding machine the combination of a hopper; a channel bar secured, web upwards, in the bottom of the hopper, the channel bar having a series of openings formed in its web forming seed inlets and intervening open ended chambers, and lateral openings formed in one of its flanges serving as outlets from said chambers.

7. In a seeding machine, the combination of a hopper; a plurality of lateral seed outlets therefrom; shields over said outlets; a bar adapted for reciprocating motion for the purpose of carrying seed or material to each of said outlets, the upper surface of the bar sloping from back to front.

8. In a seeding machine, the combination of a hopper; a plurality of lateral seed outlets therefrom; shields over said outlets; a serrated bar adapted for reciprocating motion for the purpose of carrying seed or material to each of said outlets, the upper surface of the bar sloping from back to front.

Signed at Toronto, Canada, this 22nd day of Sept., 1922.

THOMAS J. McBRIDE.